US006829590B1

(12) United States Patent
Greener et al.

(10) Patent No.: US 6,829,590 B1
(45) Date of Patent: Dec. 7, 2004

(54) ENHANCED ONLINE SALES RISK MANAGEMENT SYSTEM

(75) Inventors: Sharon Greener, Rumson, NJ (US); Mark Higgins, New York, NY (US); Effie Konstantine Anagnostopoulos, New York, NY (US); Paul Young, New York, NY (US); Dan Rothman, New York, NY (US); John Godfrey, London (GB); Mel Gunewardena, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 547 days.

(21) Appl. No.: 09/702,956

(22) Filed: Oct. 31, 2000

Related U.S. Application Data

(63) Continuation-in-part of application No. 09/526,606, filed on Mar. 16, 2000.
(60) Provisional application No. 60/218,184, filed on Jul. 14, 2000, and provisional application No. 60/179,373, filed on Jan. 31, 2000.

(51) Int. Cl.$^7$ .............................................. G06F 17/60
(52) U.S. Cl. .............................. 705/38; 705/31; 705/38
(58) Field of Search .............................. 705/31, 38, 37

(56) References Cited

U.S. PATENT DOCUMENTS

| 5,787,402 | A | | 7/1998 | Potter et al. | ................... 705/37 |
| 5,963,923 | A | | 10/1999 | Garber | ......................... 705/37 |
| 6,269,345 | B1 | * | 7/2001 | Riboud | ......................... 705/35 |
| 2001/0056398 | A1 | * | 12/2001 | Scheirer | ....................... 705/38 |
| 2002/0152156 | A1 | * | 10/2002 | Tyson-Quah | ................. 705/38 |

FOREIGN PATENT DOCUMENTS

| EP | 1197887 A1 * | 4/2002 | ........... G06F/17/60 |
| EP | 1 197 887 A1 * | 4/2002 | ........... G06F/17/60 |
| WO | WO 01/44995 A2 * | 6/2001 | ........... G06F/17/60 |

* cited by examiner

*Primary Examiner*—Vincent Millin
*Assistant Examiner*—Charles R. Kyle
(74) *Attorney, Agent, or Firm*—Joseph P. Kincart; Clifford Chance US LLP (57) ABSTRACT

The present invention provides a method and system to implement risk management of foreign exchange of currency related to an online transaction. According to the present invention an exchange price and a tolerance parameter can be determined for a foreign currency as the foreign currency relates to a base currency. A computer system can receive a spot price relating to a market price for exchange of a foreign currency and compare the spot price with the tolerance parameter. The system can modify the exchange price if spot price exceeds the tolerance parameter. In addition, the system can receive information including the base currency amount involved in an online transaction and transmit the base currency amount and the foreign currency amount, wherein the foreign currency amount is derived according to the exchange price. If desired, a first tolerance parameter and a second tolerance parameter can be utilized, wherein a rise in the spot price is compared to the first tolerance parameter and a fall in the spot price is compared to the second tolerance parameter. In addition, the magnitude of the first tolerance parameter does not need to be equal to the magnitude of the second tolerance parameter. A rise in the spot price can be compared to the tolerance parameter such that the exchange price is modified if the spot price is higher than the tolerance parameter. Similarly, only a fall of the spot price can be compared to the tolerance parameter such that the exchange price is modified if the spot price is lower than the tolerance parameter. Additionally, a spot price can be determined and compared to the tolerance level at predetermined periods of time. An original tolerance level can be modified to create a new tolerance level, if the spot price exceeds the original tolerance level.

16 Claims, 5 Drawing Sheets

306 ASKING $1,000,000 USD

| | LOCAL CURRENCY | FX RATE | PRICE IN USD |
|---|---|---|---|
| 301 | | | |
| 302 EUROPEAN BUYER | 1,020,000 | 0.9588 USD/EUR | 977,976 |
| 303 KOREAN BUYER | 1,093,272,200 | 1110 KRW/USD | 984,930 |
| 304 AUSTRALIAN BUYER | 1,600,000 | 6000 AUD/USD | 960,000 |
| 305 CANADIAN BUYER | 1,400,000 | 1.4575 CAD/USD | 960,549 |
| BRITISH BUYER | 625,000 | 1.585.0 USD/GBP | 990,625 |

| | LOCAL CURRENCY | FX RATE | PRICE IN USD |
|---|---|---|---|
| 316 | | | |
| 317 EUROPEAN SELLER | 1,500,000 | 0.9588 USD/EUR | 1,438,200 |
| 318 KOREAN SELLER | 1,100,000,000 | 1110 KRW/USD | 990,991 |
| 319 AUSTRALIAN SELLER | 1,750,000 | 6000 AUD/USD | 1,050,000 |
| 320 CANADIAN SELLER | 1,600,000 | 1.4575 CAD/USD | 1,097,770 |
| BRITISH SELLER | 620,000 | 1.585.0 USD/GBP | 982,700 |

ENHANCED ONLINE SALES RISK MANAGEMENT SYSTEM

CROSS REFERENCE TO RELATED APPLICATIONS

This application is a continuation-in-part of a prior application entitled "Online Sales Risk Management System," filed Mar. 16, 2000, bearing the Ser. No. 09/526,606 which claimed the benefit of provisional application entitled "Retail System Currency Exchange," filed Jan. 31, 2000, bearing the Ser. No. 60/179,373 the contents of which are relied upon and incorporated by reference. In addition this application claims the benefit of a provisional application entitled "Enhanced Online Sales Risk Management System" filed Jul. 14, 2000 and bearing the Ser. No. 60/218,184 the contents of which are relied upon and incorporated by reference.

BACKGROUND

A risk management system has been previously described whereby an e-commerce participant can have relevant sales information, such as requested purchase price, current bid, highest bid, etc. displayed in the currency local to that e-commerce participant. It has also been provided that the information displayed is formulated using a base currency, and an exchange price relative to that base currency. It will be known by those in the art that should either the base currency or the exchange price fluctuate, then the price information displayed in local currency to the e-commerce participant will also fluctuate. If the price information is displayed in real time, such fluctuations could cause the displayed information to change often, possibly continually. Such a display is not conducive to completing business transactions. Frequent fluctuation in the price displays may be disconcerting for the e-commerce participant, and may make it difficult for the e-commerce participant to determine which of the various options is the most favorable. Thus, it is desirable to have a risk management system that eliminates at least a portion of the price fluctuations.

International e-commerce is forecasted to substantially increase in the immediate future. It is possible that e-commerce will account for almost 10% of global sales of goods and services within the next several years. Business to business (B2B) transactions will most likely constitute the majority of that figure. One important benefit of B2B e-commerce is the degree to which it expands a company's "potential" client base to markets across the globe. Consequently, international or global e-commerce may ultimately account for a majority of e-commerce transactions.

In the evolving e-commerce market, few transaction mediums have considered the large currency transactions associated with this new form of international trade, let alone ways of hedging the foreign exchange (FX) risk associated with such transactions. As B2B commerce evolves over the next several years, both regional e-business communities and existing cross-border B2B players will capitalize on the opportunity to dramatically increase their client base and revenues by expanding into global markets. While issues such as security, trade management, and taxation have been addressed by B2B players as they begin their international initiatives, foreign exchange has largely been ignored. This is despite the fact that FX market volatility can markedly change the price of goods sold on the internet, alter the terms of trade agreements, and even be the determining factor as to whether a transaction occurs between two parties.

Increased use of the Internet and other dispersed computer communications networks by commerce participants has also resulted in an increase in the number of transaction facilitators operating on such networks. Transaction facilitators can assist commerce participants in finding and negotiating with other commerce participants such that transactions can be completed. Transaction facilitators can take many forms, such as an internet portal, or even a traditional brick and mortar establishment.

Generally, the transaction facilitator provides a medium through which a purchaser or a seller can make its goods and services known to a potential seller and purchaser, respectively. For example, a facilitator may be a website where a seller posts information regarding their product, including price information. Interested purchasers may then visit the website and view the product and sales information for multiple sellers. From this information, the purchaser may complete the transaction with the seller which has the most favorable terms. It is known that the converse situation can similarly occur whereby the purchaser posts information related to the product sought and terms of purchase, and potential seller's review the bid information to select the transaction with the most favorable terms. An example of such a portal is EBay®, whereby potential buyers and sellers post information on the Ebay® website, and the commerce participants are able to determine which option is the most desirable. Another example would include a business to business (B2B) online exchange. An e-commerce transaction facilitator provides a marketplace where a potential purchaser and a potential seller can negotiate and consummate an e-commerce transaction.

It is known for a transaction facilitator to obtain payment from one of the commerce participants each time a transaction is completed. Therefore, it is beneficial to the transaction facilitator to complete as many transactions as possible. Thus, transaction facilitators want to provide the commerce participants with all the information they need to complete the transaction.

Pricing and other financial information can be a key factor in the completion of a transaction. It is beneficial for the transaction facilitator to be able to provide price and other information to each of the commerce participants. In particular, it is beneficial for the transaction facilitator to provide price and other financial information to the commerce participants in a currency local to the commerce participants. As disclosed in another embodiment of this invention, such information can then be displayed either individually or collectively, such that the commerce participant can select the most beneficial transaction.

Providing pricing information in the local currency of the commerce participants can be difficult if the commerce participants engage in commerce using different currency. For example, if the seller engages in commerce in a first currency, the purchaser in a second currency, and the transaction facilitator in a third currency, the transaction facilitator must be able to provide the relevant information in all three currencies. It will be appreciated that given the number of currencies used in the global economy, most transaction facilitators are ill-equipped to provide such financial information and services.

Business to customer (B2C) and B2B commerce, including regional e-business communities and existing cross-border players will capitalize on the opportunity to dramatically increase their client base and revenues by expanding into global markets. While issues such as security, trade management, and taxation have been addressed by e-commerce players in their international initiatives, foreign exchange has largely not been satisfactorily addressed. FX market volatility can markedly change the price of goods sold on the internet, alter the terms of trade agreements, and even be the determining factor in whether a transaction occurs between two parties. E-commerce sites interacting internationally would benefit by transparently embedding the inherent foreign exchange conversion into all their commercial transactions. What is needed is a Foreign Exchange (FX) pricing platform which will enable sites to show prices to each participant in the participant's local currency. When a transaction is executed, the necessary foreign exchange trade should automatically be conducted so that both a purchaser and a seller transact in their own local currencies.

It would be beneficial to have a risk management system which can provide price and other financial information in the local currencies for each of the purchaser, seller and transaction facilitator. In particular, the risk management system should be able to perform risk management services when a first commerce participant uses a first currency, a second commerce participant uses a second currency, and a transaction facilitator uses a third currency. It would further be beneficial to provide a system whereby the commerce participants and the transaction facilitator can view the financial information in a currency local to one or more of the other participants in the transaction.

SUMMARY

Accordingly, the present invention contemplates a risk management system for facilitating an e-commerce transaction wherein the participants to the transaction engage in commerce using different currencies. In particular, the invention contemplates three parties to the transaction, a purchaser, a seller and a transaction facilitator. The transaction facilitator may be a web portal, a brick and mortar establishment, or any other commerce participant whose role in the transaction is to bring the purchaser and seller together such that they may complete a transaction. The present embodiment of the risk management system enables a purchaser, seller and transaction facilitator to share and exchange financial information related to a transaction, where each participant conducts commerce in distinct currencies. The risk management system interacts with the transaction facilitator to provide the necessary currency conversion.

The present invention can also be configured to limit risk associated with fluctuations in a currency price offered by a currency exchange institution to an e-commerce participant. Fluctuations in currency price can be caused, for example, by fluctuations in the market or spot price of the currency. The currency exchange institution can limit risk associated with such fluctuation by setting the currency price at a specified rate and adjusting the specified rate if delta between the market price and the specified rate exceeds a predetermined threshold. The currency exchange institution can then monitor the market price of the relevant currency, and if market price exceeds a certain tolerance that is either above or below the specified rate, the currency price can be re-negotiated. Re-negotiation of the currency price may take place in any means set forth by the parties, for example in face-to-face discussions, by telephone, by email, or automatically by a computer according to agreed upon terms.

Functions associated with tolerance initiated price negotiation including the monetary conversions, periodic monitoring of spot price, comparison with set parameters, and adjustment of the set currency price can be performed by a currency exchange risk management system. Additionally, the currency exchange institution can monitor the spot price continuously or at various time intervals and either alert interested parties when the tolerance is exceeded, or automatically adjust the specified rate according to a predetermined algorithm. The present invention thereby accounts for fluctuations in the market price of the relevant currency and provides stability for the currency price within a given range.

Online risk management can provide distinct advantages in terms of pricing, marketing, site use, and expansion overseas. For example, B2B players can view and make prices in their local currency thereby fostering "user friendliness" and promoting international expansion which in turn can increase a potential client base and transactional volume. The current invention can also provide foreign exchange transparency and competitive pricing. B2B players can have the ability to hedge foreign exchange risk immediately, thereby reducing a risk associated with related volatility.

The present invention provides a method and system to implement risk management of foreign exchange of currency related to an online transaction. The present invention can determine an exchange price and a tolerance parameter for a foreign currency as the foreign currency relates to a base currency. A computer system can receive a spot price relating to a market price for exchange of a foreign currency and compare the spot price with the tolerance parameter. The system can modify the exchange price if spot price exceeds the tolerance parameter. In addition, the system can receive information including the base currency amount involved in an online transaction and transmit the base currency amount and the foreign currency amount, wherein the foreign currency amount is derived according to the exchange price.

In one embodiment, the present invention can determine a first tolerance parameter and a second tolerance parameter, wherein a rise in the spot price is compared to the first tolerance parameter and a fall in the spot price is compared to the second tolerance parameter. In addition, the magnitude of the first tolerance parameter is not equal to the magnitude of the second tolerance parameter. If desired, only a rise in the spot price can be compared to the tolerance parameter such that the exchange price is modified if the spot price is higher than the tolerance parameter. Similarly, only a fall of the spot price can be compared to the tolerance parameter such that the exchange price is modified if the spot price is lower than the tolerance parameter.

In one aspect, a spot price can be determined and compared to the tolerance level at predetermined periods of time. Additionally an original tolerance level can be modified to create a new tolerance level, if the spot price exceeds the original tolerance level.

In another aspect, the present invention can include a computer system for providing risk management relating to online transactions. A computer server can be made accessible with a network access device via a communications network; and executable software can be stored on the server and be made executable on demand via the network access device. Software operative with the server to can be utilized to determine an exchange price for a foreign currency as the foreign currency relates to a base currency and determine a tolerance parameter for the foreign currency price as the foreign currency relates to a base currency. The system can receive a spot price relating to a market price for exchange of the foreign currency and compare the spot price with the tolerance parameter. The exchange price can be modified if the spot price exceeds the tolerance parameter.

The software can calculate a modified exchange price if the spot price exceeds the tolerance parameter. In addition, the system can be operative to display the foreign currency price and a corresponding base currency price.

Other embodiments can include a computer executable program code residing on a computer-readable medium or a computer data signal embodied in a digital data stream.

DETAILED DESCRIPTION

Figure 1:
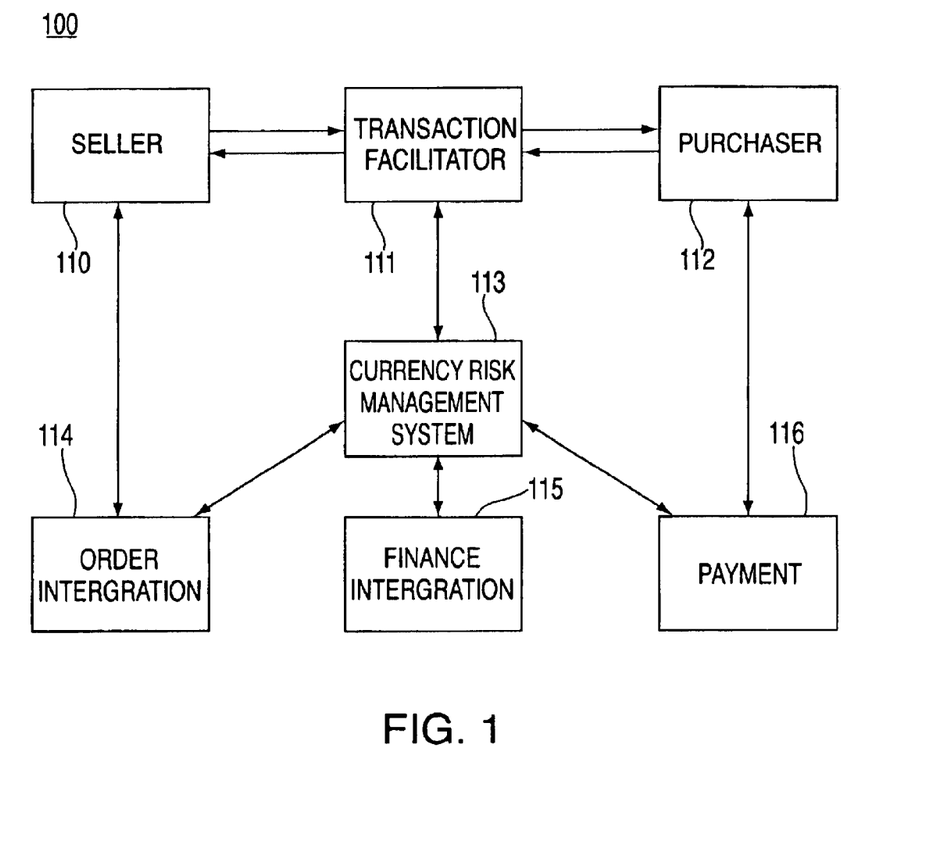
FIG. 1 illustrates block components which can embody this invention.

The present invention contemplates a risk management system 113 for facilitating an e-commerce transaction wherein the participants to the transaction engage in commerce using multiple currencies. In particular, the invention contemplates three parties to the transaction, a seller 110, a transaction facilitator 111 and a purchaser 112. The transaction facilitator 111 may be a web portal, a brick and mortar establishment, or any other commerce participant whose role in the transaction is to bring the seller 110 and purchaser 112 together such that they may complete a transaction.

A currency exchange institution can limit risk associated with currency price fluctuations by monitoring spot price of a given currency, and modifying an exchange price for that currency when the spot price exceeds predetermined limits. In particular, the currency exchange institution can negotiate a mechanism for determining a currency exchange price with an e-commerce participant and implement the mechanism through an automated system. For example, a mechanism can include a tolerance level. The tolerance level can be negotiated by a currency exchange institution and an e-commerce participant. Under this embodiment of the invention, when an associated spot price either exceeds or falls below the negotiated tolerance level, the currency price can be modified accordingly.

Referring to FIG. 1, a risk management system 1113 enables a purchaser, seller and transaction facilitator 111 to share and exchange financial information related to a transaction, where each participant conducts commerce in distinct currencies. The risk management system 113 interacts with the transaction facilitator 111I and transaction participants to provide the necessary currency conversion. In one embodiment, the risk management system 1113 can be provided by a financial institution, such as a bank.

A transaction facilitator 111 is connected to a dispersed network communications system. The transaction facilitator 111 can operate a medium, such as an internet website, whereby other computers that are part of the network communications system can send and retrieve information related to commercial transactions. For example, a seller 110, commerce participant can use a computer to send information related to certain products or services he wants to sell. If the seller is located, for example, in Japan then the information displayed on his computer and the information sent to the transaction facilitator 111 will be in Japanese Yen. Such information can be received by the transaction facilitator 111 and posted on its website. If the transaction facilitator 111 is located in the United States, the transaction facilitator 111 may prefer to view and post this information in U.S. Dollars. When the information is received in Yen, the transaction facilitator 111 then sends such information to the currency exchange system, in the manner provided heretofore. The currency exchange system converts the financial information from Yen to Dollars, and transmits the converted information to the transaction facilitator 111 for display on the website.

Parties interested in the products or services being offered can then go the website and retrieve the information related to commerce participant's offering. For example, a purchaser, commerce participant (b) can go the website and retrieve such information. If the purchaser is located in Europe, he preferably would view such information in Euros. Purchaser would inform the transaction facilitator 111, either automatically through his computer settings or as a selection on the website, the currency in which the purchaser would like to view the information. Once the transaction facilitator 111 has received such information, the transaction facilitator 111 can contact the currency exchange system. The currency exchange system would then convert the financial information from Dollars to the selected currency of the purchaser, in this case Euros, and then transmit the information back to the transaction facilitator 111. The transaction facilitator 111 could then send such information to the purchaser for viewing in Euros.

It will be apparent to those in the art that the risk management system 113 provided will allow all commerce participants and potential commerce participants to view the relevant financial information in the currency of their choice. Additionally, the commerce participants could choose to view the financial information in currencies other their own local currency, or in multiple currencies. Thus, the system allows a commerce participant 110 112 to view the relevant financial information in the commerce participant's 110 112 own local currency, in the currency of another commerce participant 110 112, in the currency of the transaction facilitator 111, in a previously unmentioned currency, or in several currencies at once. The present invention can thereby facilitate a commerce participant's 110 112 choice of which transactions will best fulfill their needs.

For example, should the purchaser 112 be located in Japan, the seller 110 in Europe, and the financial institution in the United States, the risk management system 113 can make the requisite currency conversions and display the information in the currency local to each party. The system described herein performs two transactions, converting the pricing information from the seller in Euros to U.S. Dollars, and then from U.S. Dollars to Japanese Yen for display to the purchaser 112. Similarly, purchase information transmitted from the purchaser 112 to the seller also requires two transactions, i.e., conversion from Japanese Yen to U.S. Dollars, and then from U.S. Dollars to Euros for display to the seller. In this manner, each party to the transaction can review the sale information in their own local currency.

A full scale e-purchasing solution according to the present invention can include transaction payment and settlement, credit evaluation and clearing, and fulfillment services. E-financing services can be dependent on each other and be integrated with each other thereby adding value as a full-scale financing solution. The present invention includes a full-scale offering which can provide a solution for back-end steps, front-end steps in the e-procurement chain, exploration, negotiation and ordering.

A first step can include integrating financing, escrow, insurance, and credit products integrated into an e-commerce infrastructure that offers alternative forms of payment guarantees. The e-finance solution of the present invention can address a variety of risks including market risk of a purchaser 112 and/or a seller 110, short-term exposure to a single entity in a one-to-many model, and commercial performance risk.

A second step can include integrating orders into a system of fulfillment functions including invoicing, shipping documents, customs clearances. This system can also be enhanced with standardized document exchange across systems. In addition, an integrated offering can provide solutions for linking FX to delivery of goods thereby addressing delay or failure to deliver goods. Delay or failed delivery can affect market risk as payment may not be made on contractual settlement date.

A third step can encompass payment. International transactions can utilize automatic, bundling of foreign exchange pricing and risk-transfer solutions. An international pricing platform can tie into other steps in back-end of the procurement chain, including credit evaluation, trade financing, logistics, and transaction settlement. In particular, an international pricing platform can include payments which tie into ACH and other EFT networks that work across banks. In addition, payment repudiation can be addressed as the ACH payment mode allows significant time to pass before a purchaser 112 is completely unable to call back payment. Therefore the frequency of call-back can be analyzed to gauge materiality of increased risk.

A transaction participant can integrate an accounts payable systems with web-initiated payment messages. Transaction participants can thereby reconcile services that match data transmitted throughout market sites to banks, and data in accounts payable and receivable systems. In one embodiment, a seller 110 can offer a purchaser 112 special payment terms that depend on financing relationships.

A transaction facilitator 111 can be connected to a dispersed network communications system, such as the Internet, an intranet or a private network. The transaction facilitator 111 can operate an interactive medium, such as a website, graphical user interface (GUI) or other network interface. A user with a network access device, such as a computer can access the network interface to send and retrieve information related to transactions. For example, a seller 110, or other commerce participant, can use a computer to send information related to certain products or services he wants to sell. If the seller 110 is located, for example in Japan, then the information displayed on the seller's computer and the information sent to the transaction facilitator 111 will be in Japanese Yen. Such information is received by the transaction facilitator 111 and posted on its website. If the transaction facilitator 111 is located in the United States, the transaction facilitator 111 may prefer to view and post currency information in U.S. Dollars. Information received in Yen can be routed through the currency exchange system in a manner consistent with those provided heretofore. The currency exchange system converts the financial information from Yen to Dollars, and transmits the converted information to the transaction facilitator 111 for display on the website, or other interface.

Parties interested in products or services being offered by a commerce participant can access a website supported by the participant and retrieve the information related to commerce participant's offering. The information can retrieved can be tailored to the preferences of an interested party. For example, if the party is a purchaser located in Europe, the purchaser may prefer to view such information in Euros, or a local currency. The purchaser can indicate to a transaction facilitator 111 their viewing preferences or relay such information directly to a currency exchange system. Indications, including the currency in which the purchaser would like to view the information, can be made via computer settings, such as in a user profile, or via interaction with a user interactive website. The transaction facilitator 111 can also relay the information to the currency exchange system. The currency exchange system can convert financial information from one currency according to a predetermined arrangement, such as from Dollars to Euros, or other selected currency of the purchaser at a predetermined price. The currency exchange system can also transmit the information back to the transaction facilitator 111, in which case the transaction facilitator 111 can provide the Euros information to the purchaser for viewing.

It will be apparent to those in the art that the risk management system 1113 provided will allow all commerce participants and potential commerce participants to view relevant financial information in the currency of their choice. Additionally, the commerce participants can choose to view financial information in currencies other their own local currency, or in multiple currencies. Thus, the system allows a commerce participant 110 112 to view financial information in their own local currency, in the currency of another commerce participant 110 112 in the currency of the transaction facilitator 111, in a previously unmentioned currency, or in several currencies at once. Through this system, the commerce participants can choose parameters relating to a the transaction which best fulfills the participant's needs.

Figure 2:
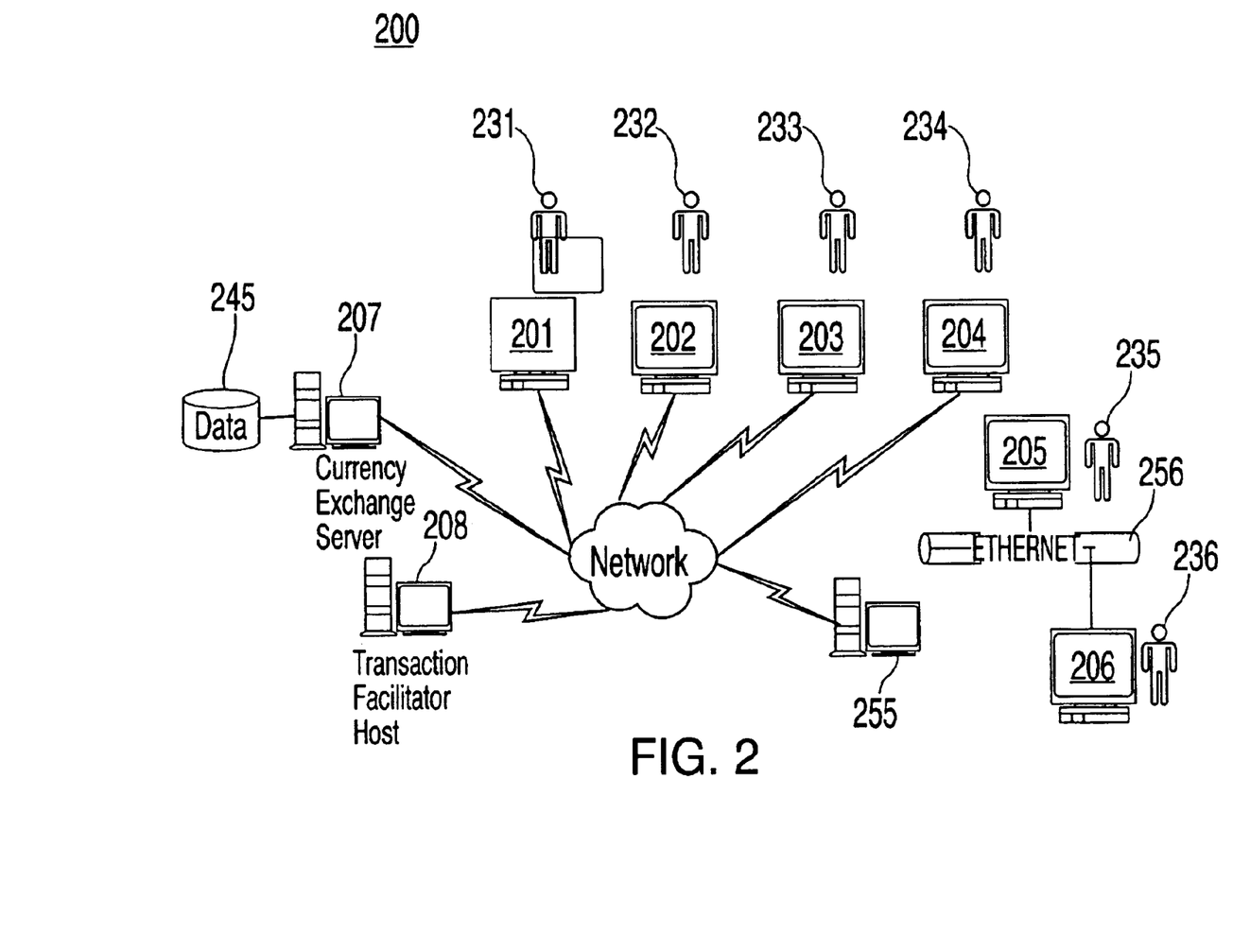
FIG. 2 illustrates a network on computer systems that can embody an enhanced online sales risk management system.

FIG. 2 shows a network of computers 200 that may be used in one implementation of an on-line sales risk management system 100. The network 200 can include a transaction facilitator system 208 and exchange system participant network access devices 201–206. Each of the network access devices can include a processor, memory, a user input device, such as a keyboard and/or mouse, and a user output device, such as a video display and/or printer. The exchange system participant network access devices 201–206 can communicate with the transaction facilitator system 208 to obtain information stored as data on a storage medium 245 at the transaction facilitator 208. In addition, a participant 231–236 operating a network access device 201–206 may complete a transaction with a transaction facilitator system 208.

A transaction facilitator system 208 may include multiple processing and database subsystems, such as cooperative or redundant processing and/or database servers which can be geographically dispersed throughout the network 200. In some implementations, two or more customer computers 205–206 may communicate with other nodes 201–208 through a local network 256. The local network 256 can also include a local server 255 such as a proxy server or a caching server.

In general, the participants will communicate with a currency exchange risk management system 113. The currency exchange system will log sales data from sales transactions and apply the predetermined currency price for the predetermined time schedule. In addition, the currency exchange risk management system 113 can calculate a risk exposure based upon sales volume and market data. In one embodiment, the calculation for risk exposure is performed for a given currency, using an aggregate of sales transacted in that currency. In another embodiment, the calculation for risk exposure can be performed on a sum of the aggregate sales for all currencies. Other risk calculations can also be performed and are within the scope of this invention.

Currency price can be programmed according to almost any criteria that serves the parties involved. For example, a price can be set for a predetermined period of time or relative to an upper and lower limit of a currency spot price. A price set relative to an upper and lower limit of the spot price can utilize a formula for determining when the currency price should be reset. Pricing can be set according to a negotiation by interested parties, or simply recalculated according to a predetermined formula.

One algorithm that can be used to determine if a price needs to be reset can be represented as follows:

$$X = Y \text{ if } A \leq Z \geq B$$

wherein: X is the currency price;

Y is the currency price negotiated by the financial exchange institution and the e-commerce participant;

Z is the spot price;

A is the lower tolerance level; and

B is the upper tolerance level

Calculations and comparisons described in this embodiment may preferably be performed by the currency exchange risk management system 113. The negotiated currency price and tolerance level may be entered into the currency exchange risk management system 1113 and stored therein. The currency exchange risk management system 113 can thereby store the currency price and tolerance levels for numerous commerce participants. Pricing criteria for each participant can be completely independent of other arrangements a financial institution may have made. When the transaction facilitator system 208 notifies the currency exchange risk management system 113 of a transaction, the currency exchange risk management system 113 can perform the necessary calculations and present the currency amounts to various interested parties.

In one embodiment, the currency exchange system 113 can continuously monitor spot price and adjust the spot price when the delta exceeds a predetermined tolerance, such as 10%. In another embodiment, the currency exchange risk management system 113 can determine a spot price at the time of a transaction and compare it with the negotiated tolerance levels for the particular commerce participant involved. If the spot price is within the tolerance levels negotiated for that commerce participant, the currency exchange risk management system 113 will notify the transaction facilitator 208 to complete the transaction. If, however, the spot price is above or below the tolerance levels negotiated for that commerce participant, the currency exchange risk management system 113 will either recalculate the currency price, or notify the financial institution and the commerce participant that the currency price should be re-negotiated. Once the currency price has been recalculated or re-negotiated, and the modified currency price has been entered into the currency exchange risk management system 1113, the system will complete the transaction using the modified currency price.

To allow the smooth flow of operations for the e-commerce participant and its customers, it may be desired to prevent transactions from being stalled while the currency exchange risk management system 113 waits for the financial institution and the commerce participant to re-negotiate the currency price. To avoid such delays the currency exchange risk management system 113 can be programmed such that, by way of example, in the event the spot price exceeds the negotiated tolerance level, the system 107 will allow the transaction to be completed, but at the spot price instead of the negotiated currency price. Alternatively, the system 107 may be programmed to compute a modified currency price, based upon parameters previously set by the financial institution and the commerce participant, and to complete the transaction at the modified currency price.

By way of example only, a currency exchange institution and an e-commerce participant can negotiate an exchange price of 100 Japanese Yen per 1 United States Dollar ("USD"), with a 10% tolerance level. If the spot price for Japanese Yen rises to 105 Japanese Yen per 1 USD, then the exchange rate between the currency exchange institution and the e-commerce participant will remain at 100 Yen per 1 USD, since the spot price is within the 10% tolerance level. If, however, the spot price for Japanese Yen should further rise to 112 Yen per 1 USD, then the spot price will have exceeded the tolerance level of 10%, and the currency exchange rate will be re-negotiated. Similar calculations and comparisons may be performed should the spot price of the relevant currency fall below the tolerance level established by the exchange participants.

Participants in the transaction should not need to wait for the occurrence of a transaction before determining if the currency price is within the negotiated tolerance levels. The spot price for the relevant currency may be determined at periodic intervals, as often as the parties to the transaction deem necessary. In a highly volatile currency market, the spot price may be monitored more frequently to more accurately reflect the changing price for the currency. Additionally, in a highly volatile market, the currency exchange rate may require more frequent re-negotiation. Conversely, in a more stable currency exchange market, the spot price need not be determined as often, since the currency exchange rate will not be expected to require amendment as often as in a volatile market. Monitoring the spot price on a periodic basis may eliminate the need to perform such calculations when a new transaction arises, and thus allows the transaction to be completed without delay.

The tolerance levels set by the currency exchange institution and the e-commerce participant need not be identical for rising spot prices and falling spot prices. For example, should the parties be more concerned with the movement of the spot price in one direction than the other, they may institute a higher tolerance level for fluctuations in one direction, and less tolerance for fluctuations in the other direction. In such a situation, the currency exchange price can be calculated as follows:

$$X = Y \text{ if } A \leq Z \geq B \text{ and } A \neq B$$

where: X is the currency price;

Y is the currency price negotiated by the financial exchange institution and the e-commerce participant;

Z is the spot price;

A is the lower tolerance level; and

B is the upper tolerance level

Additionally, the tolerance level may be set for only one direction of spot price movement. For example, the financial institution and the commerce participant could negotiate that the currency price be held constant should the spot price rise, but the currency price be re-negotiated should the spot price fall below a predetermined level. Conversely, the participants could agree to re-negotiate the currency price should the spot price rise above a predetermined level and held constant should the spot price fall below the negotiated currency price.

It will be understood by those in the art that in each embodiment disclosed herein, instead of modifying the currency price when the spot price exceeds a negotiated tolerance level, the tolerance level may be changed or re-negotiated by the participants to the transaction. To implement this invention, it is preferable to have a predetermined equation for determining the currency price, and a predetermined tolerance above, and a predetermined tolerance below the currency price.

In one embodiment, a foreign exchange currency exchange risk management system 113 can include a live pricing feed and be integrated into a back-end technological infrastructure. The financial institution can provide competitive foreign exchange rates directly to portals. The portals and exchanges can, in turn, present the rates to a purchaser 112 and a seller 110 via the financial institution's site.

A currency exchange risk management system 113 can lower costs and reduce risks connected with cross-border transaction. Additionally, this technology can be integrated into a B2B company's existing back-end infrastructure. A scalable architecture can allow a participant to begin with limited services and progress to include a full-scale solution that handles credit, foreign exchange conversion, transaction settlement, and logistics.

A currency exchange risk management system 113 can present to users of B2B exchanges and portals both bid and ask prices in their local currencies, regardless of what country a supplier 111 or a purchaser 112 on the opposite side of the transaction is located. These prices be programmed to adjust in real-time via a live pricing feed, or be set for a predetermined period of time.

Figure 3A:
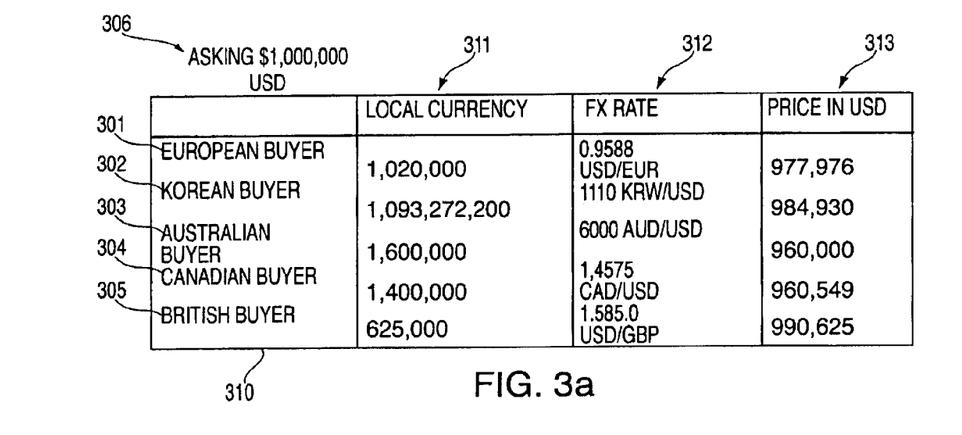
FIGS. 3a and 3b illustrate exchange rate interfaces.

Referring now to FIG. 3, a U.S. based supplier can post an asking price 306, such as, for example USD 1 million for X widgets. A purchaser 112, such as a European buyer 301, a Korean buyer 302, an Australian buyer, a Canadian buyer 304, or a British buyer 305 can view a price posted in a local currency 311, as well as an FX rate 312 and the price converted to another currency, such as U.S. Dollars 313.

A buyer 301–305 can also post an offer to buy in the buyer's 301–305 local currency 311, which can be automatically converted such that the supplier can view the prices only in USD 313, or perhaps USD and the seller's currency 311 313. A supplier may be able to benefit from such automatic viewing, as the supplier can easily determine which purchaser 301–305 is offering a price most favorable in USD terms.

Figure 3B:
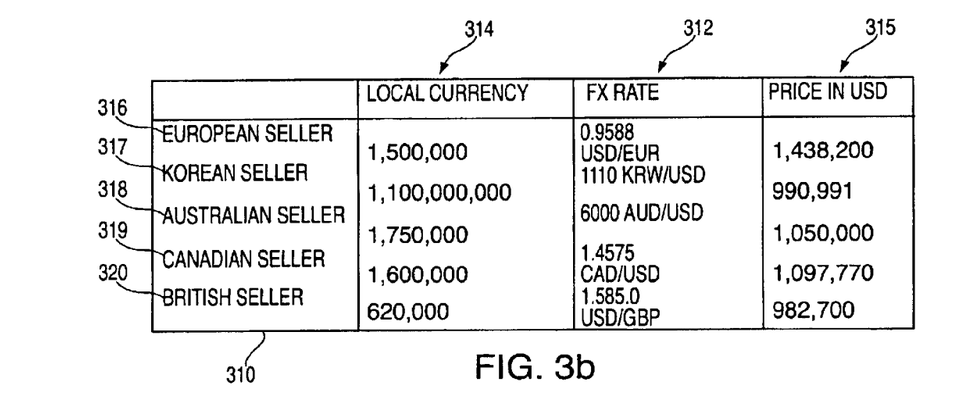

Similarly, a purchaser 112 can see supplier prices 314 converted from a currency of choice of the supplier 314, to a currency of the purchaser's choice, such as USD 315. One embodiment, including multiple sellers 110 allows the purchaser 112 to display multiple offers for sale 314 wherein the offers can originate in a currency chosen by each supplier and displayed in a currency chosen by the purchaser 315. In this manner, a relative cost of goods can include the price of foreign exchange. A single interface can include multiple prices for ease of comparison.

Referring now again to FIGS. 3a and 3b, examples are also illustrative of an interface fed by a live pricing mechanism, such as a data deed. Live prices can continuously fluctuate via the live pricing feed, and thus, so would the bid and ask prices on site users' screens. In addition, the currency exchange risk management system 113 could present the feel of an exchange trading floor. A purchaser 112 and a supplier can be brought closer on pricing discrepancies.

Figure 4:
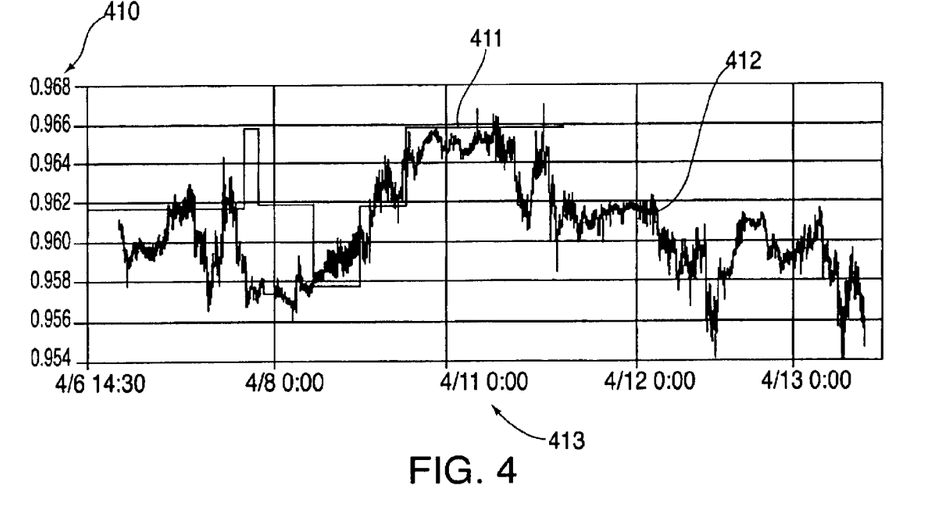
FIG. 4 illustrates a graphical representation of a method of determining an currency price tolerance.

Referring now to FIG. 4, foreign currency prices can be adjusted according to an established series of daily "fixes" made for a currency pair. Prices which are shown to participants can remain constant so long as a related foreign exchange rate remains within a pre-determined number of pips on either side of the price fix. If the foreign exchange rate moves out of that band, the price shown to a purchaser 112 and a seller 110 would shift to reflect a new band. The result can be a step like series of price bands rather than constantly fluctuating prices.

In the example illustrated, a price band 411 tracks live data 412 of a currency. The price band can sometimes reflect a better price than the currency rate. However, when the currency rate moves outside a predetermined number of pips on either side of the price fix, in this case 0.962, the FX rate shown to customers will shift higher or lower to a new fixed band, reflecting an underlying movement in the currency. Therefore, live price can be displayed within pre-specified bands and prices would shift on participant's screens as prices moved outside the predetermined bands.

Figure 5:
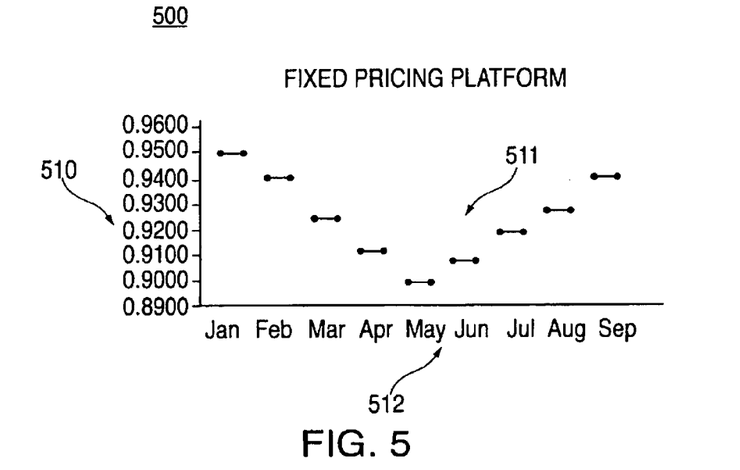
FIG. 5 illustrates a graphical representation of another method of determining an currency price tolerance.

Referring now to FIG. 5, in another embodiment, a bank or other financial institution can fix a series of rates 511 for a currency pair, each rate a negotiated or otherwise determined price 510. The series of rates 511 would then remain valid for a fixed period of time 512, such as, one week, one month or one quarter. The rates can be sent to a B2B or B2C company at the beginning of the appropriate time period, and the company can use these rates to set prices on their goods in a consumer's local currency. During the course of each day, the company can send the financial institution the foreign currency flows as the flows are received. At the end of the fixed period of time, a block amount can be sent to the company in the company's local currency.

The aforementioned embodiments of the invention allow a risk management system 113 to assist internet portals facilitate economic transactions between e-commerce participants using local currencies which are distinct to each participant. When a seller 110 transacts commerce in one currency, the purchaser 112 in a second currency, and the e-commerce portal or other transaction facilitator in a third, a mechanism has been established to provide price and other financial information to each market participant in its own currency.

The present invention can provide currency information to each of the market participants in the participant's local currency. The information in local currency of the purchaser 112 can be first converted to the local currency of the e-commerce portal. In addition, the information can be converted from the currency of the e-commerce portal to that of the local currency of the purchaser 112. Conversely, information from the purchaser 112 can be converted to the currency of the e-commerce portal, and also to the currency of the seller. This dual conversion system allows each participant to the transaction view the relevant price information in his local currency. An additional aspect of the current invention allows each party to view relevant price information not only in his own currency, but also in the currency of other market participants. A further embodiment allows a market participant to compare price information of several market participants at once, thereby enabling the participant to select the most advantageous transaction.

Figure 6:
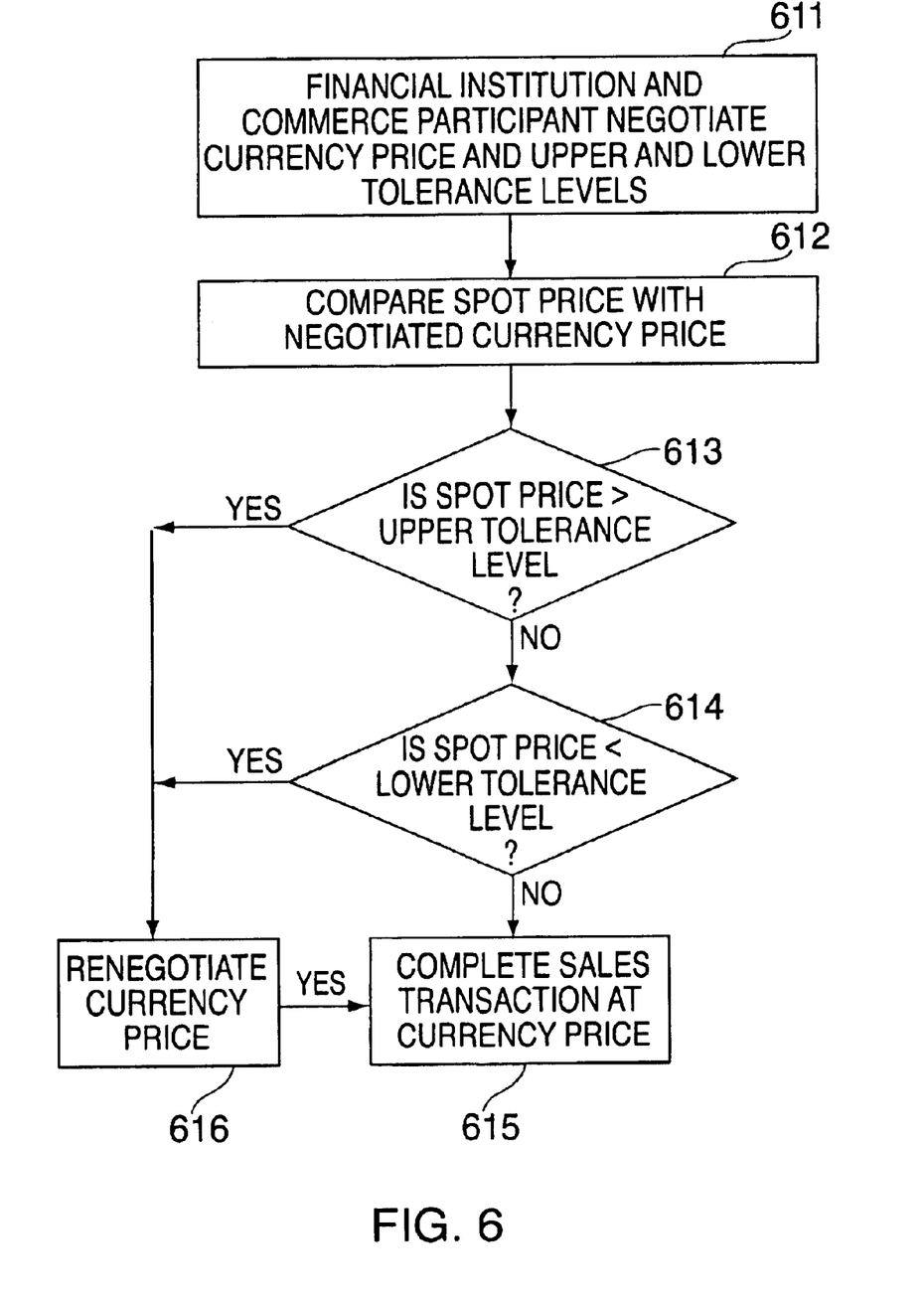
FIG. 6 illustrates an exemplary flow of a method for determining if a currency price is within tolerance.

Referring now to FIG. 6, one method of implementing the current invention can include the steps of a financial institution and a commerce participant negotiating a currency price with upper and lower tolerance levels 611. A spot price can be compared to the negotiated currency price 612. If the spot price is equal to or exceeds an upper tolerance level 613, or the spot price is less than or equal to a lower tolerance level 614, the currency price can be renegotiated 616. If the currency price is within the tolerance levels, the sales transaction can be completed at the currency price 615.

It will be well known to those in the art that the represented dispersed computer communications network depicted in FIG. 2 can take many forms and include many network architectures, as previously described. It will also be well known that the two networks shown in FIG. 2 may easily be described as one network, with dispersed computer connections. The network is drawn as it is simply to highlight the distinct currencies in which the commerce participants are operating.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired. In any case, the language may be a compiled or interpreted language. Suitable processors include, by way of example, both general and special purpose microprocessors.

Computers 201–208 involved in the present invention may be connected to each other by one or more network interconnection technologies. For example, dial-up lines, token-ring and/or Ethernet networks 110, 140, T1 lines, asynchronous transfer mode links, wireless links, digital subscriber lines (DSL) and integrated service digital network (ISDN) connections may all be combined in the network 100. The internet protocol can be adhered to and other packet network and point-to-point interconnection technologies may also be used. Additionally, the functions associated with separate processing and database servers in the exchange server 207, the transaction facilitator system 208, or other computers may be integrated into a single server system or may be partitioned among servers and database systems that are distributed over a wide geographic area.

A number of embodiments of the present invention have been described. Nevertheless, it will be understood that various modifications may be made without departing from the spirit and scope of the invention. For example, computers 201–206 can comprise a personal computer executing an operating system such as Microsoft Windows™, UniX™, or Apple MacOS™, as well as software applications, such as a web browser. Computers 201–206 can also be terminal devices, a palm-type computer WEB access device that adhere to a point-to-point or network communication protocol such as the Internet protocol. Other examples can include TV WEB browsers, terminals, and wireless access devices (such as a 3-Com Palm organizer). A customer computer may include a processor, RAM and/or ROM memory, a display capability, an input device and hard disk or other relatively permanent storage. Accordingly, other embodiments are within the scope of the following claims. Similarly, the transaction facilitator 208 and the currency exchange system 207 can be any computer system known to those skilled in the art.

What is claimed is:

1. A computerized apparatus system to facilitate management of risk associated with conducting a transaction for goods and/or services conducted in multiple currencies, the computerized apparatus system comprising:

a host computer comprising a processor and a storage for digital data; and executable software stored on the host computer storage and executable on demand, the software operative with the host computer processor to cause the host computer to:

store in the host computer storage digital data identifying a seller of at least one of: goods and services;

store in the host computer storage digital data descriptive of a currency exchange price which relates a rate of exchange between a base currency and a foreign currency and which will be adhered to for currency amounts involved in one or more transactions comprising at least one of goods and services, sold by the seller, receive into the host computer storage digital data comprising a projected amount of sales during a predetermined period of time, and indicate in the host computer storage a band of currency exchange price comprising one or more of: an upper currency exchange price tolerance parameter and a lower currency exchange price tolerance parameter, wherein each exchange tolerance parameter relates to a rate of exchange between the base currency and the foreign currency and is based upon the projected amount of sales during a predetermined period of time;

receive into the host computer storage digital data descriptive of a market spot price;

modify the currency exchange price stored in the host computer storage digital data if the market spot price is not within the band of currency price;

receive into the host computer storage digital data descriptive of one or more executed transactions, wherein the digital data descriptive of the one or more executed transactions comprises an indication that the transaction involved at least one of: goods and services sold by the seller, and also comprises an amount of the foreign currency transacted; and calculate an amount of foreign currency to be exchanged according to the currency exchange price wherein the amount of foreign currency to be exchanged is based upon the amount of foreign currency involved in the one or more transactions.

2. The computerized apparatus system of claim 1 wherein the executable software stored on the host computer storage is additionally operative with the host computer processor to cause the host computer to modify the one or more of: an upper currency exchange price tolerance parameter and a lower currency exchange price tolerance parameter, if the market spot price is not within the band of currency price.

3. The computerized apparatus system of claim 1 additionally comprising:

an e-commerce participant computer comprising a processor and a storage;

executable software stored on the e-commerce participant computer storage and executable on demand, the software operative with the e-commerce participant computer processor to cause the e-commerce participant computer to:

receive the currency exchange price that relates a base currency to a foreign currency which will be adhered to for one or more transactions which involve the sale of at least one of: goods and services, sold by the seller, and calculate a sale price for at least one of: a good and service wherein the sale price is denominated in a foreign currency and based upon the currency exchange price.

4. The computerized apparatus system of claim 3 wherein the executable software stored in the commerce participant computer storage is additionally operative with the e-commerce participant computer processor to cause the e-commerce participant computer to cause the e-commerce participant computer to transmit an offer to sell the at least one of; a good and service, for the calculated sale price denominated in a foreign currency and based upon the currency exchange price.

5. The computerized apparatus system of claim 1 wherein the digital data descriptive of one or more executed transactions comprises data descriptive of each transaction executed on a particular website.

6. The computerized apparatus system of claim 1 wherein the executable software stored on the host computer storage is additionally operative with the host computer processor to cause the host computer to:

indicate in the host computer storage at least one of an upper limit and a lower limit of an aggregate amount of currency which will be exchanged at the currency exchange price during a predetermined period of time;

track the aggregate amount of currency to be exchanged at the currency exchange price during the predetermined period of time; and provide an indication of whether the at least one of an upper limit and a lower limit of an aggregate amount of currency has been reached.

7. The computerized apparatus system of claim 1 wherein the executable software stored on the host computer storage is additionally operative with the host computer processor to cause the host computer to:

receive digital data comprising a spot price for conversion of the foreign currency to the base currency from a foreign exchange market on each respective day that each of the one or more transactions is executed;

store the digital data comprising a spot price in the computer storage; and compare the spot price to the currency exchange price adhered to for the one or more transactions.

8. The computerized apparatus system of claim 1 wherein the executable software stored on the host computer storage is additionally operative with the host computer processor to:

receive digital data comprising an indication of delivery of the at least one of: goods and services, sold by the seller; and transmit digital data comprising an instruction to exchange an amount of foreign currency calculated according to the currency exchange price and based upon the amount of foreign currency involved in the one or more transactions comprising the at least one of: goods and services, sold by the seller and delivered.

9. A computerized apparatus system to facilitate management of risk associated with conducting a transaction for goods and/or services conducted in multiple currencies, the computerized apparatus system comprising:

a host computer comprising a processor and a storage for digital data; and executable software stored on the host computer storage and executable on demand, the software operative with the host computer processor to cause the host computer to:

store in the host computer storage digital data identifying a seller of at least one of: goods and services, store in the host computer storage digital data descriptive of a currency exchange price which relates a rate of exchange between a base currency and a foreign currency and which will be adhered to for currency amounts involved in one or more transactions comprising at least one of goods and services, sold by the seller;

indicate in the host computer storage a band of currency exchange price comprising one or more of: an upper currency exchange price tolerance parameter and a lower currency exchange price tolerance parameter, wherein each exchange tolerance parameter relates to a rate of exchange between the base currency and the foreign currency;

receive into the host computer storage digital data descriptive of a market spot price;

modify the currency exchange price stored in the host computer storage digital data if the market spot price is not within the band of currency price;

receive into the host computer storage digital data descriptive of one or more executed transactions, wherein the digital data descriptive of the one or more executed transactions comprises an indication that the transaction involved at least one of: goods and services sold by the seller, and also comprises an amount of the foreign currency transacted;

calculate an amount of foreign currency to be exchanged according to the currency exchange price wherein the amount of foreign currency to be exchanged is based upon the amount of foreign currency involved in the one or more transactions:

receive digital data comprising a projected amount of sales during a predetermined period of time; and determine the currency exchange price based upon the projected amount of sales during a predetermined period of time;

and additionally comprising an e-commerce participant computer comprising processor and a storage;

executable software stored on the e-commerce participant computer storage and executable on demand, the software operative with the e-commerce participant computer processor to cause the e-commerce participant computer to:

receive the currency exchange price that relates a base currency to a foreign currency which will be adhered to for one or more transactions which involve the sale of at least one of: goods and services, sold by the seller;

calculate a sale price for at least one of: a good and service wherein the sale price is a denominated in a foreign currency and based upon the currency exchange price; and calculate a projected amount of sales which will be transacted by the seller during a predetermined period of time; and transmit digital data comprising the projected amount of sales during a predetermined period of time to the host computer.

10. The computerized apparatus system of claim 9 wherein the executable software stored in the e-commerce participant computer storage is additionally operative with the e-commerce participant computer processor to cause the e-commerce participant computer to determine a risk exposure for the predetermined time period based upon the projected amount of sales which will be transacted by the seller.

11. A computerized apparatus system to facilitate management of risk associated with conducting a transaction for goods and/or services conducted in multiple currencies, the computerized apparatus system comprising:

a host computer comprising a processor and a storage for digital data; and executable software stored on the host computer storage and executable on demand, the software operative with the host computer processor to cause the host computer to:

store in the host computer storage digital data identifying a seller of at least one of goods and services;

store in the host computer storage digital data descriptive of a currency exchange price which relates a rate of exchange between a base currency and a foreign currency and which will be adhered to for currency amounts involved in one or more transactions comprising at least one of goods and services, sold by the seller;

indicate in the host computer storage a band of currency exchange price comprising one or more of: an upper currency exchange price tolerance parameter and a lower currency exchange price tolerance parameter, wherein each exchange tolerance parameter relates to a rate of exchange between the base currency and the foreign currency;

receive into the host computer storage digital data descriptive of a market snot price;

modify the currency exchange price stored in the host computer storage digital data if the market spot price is not within the band of currency price;

receive into the host computer storage digital data descriptive of one or more executed transactions, wherein the digital data descriptive of the one or more executed transactions comprises an indication that the transaction involved at least one of: goods and services sold by the seller, and also comprises an amount of the foreign currency transacted;

calculate an amount of foreign currency to be exchanged according to the currency exchange price wherein the amount of foreign currency to be exchanged is based upon the amount of foreign currency involved in the one or more transactions; and receive into storage digital data descriptive of a projected amount of sales for one or more predetermined periods of time, from two or more sellers; and calculate a forward contract amount comprising an exchange of the base currency and the foreign currency, based upon an aggregate of two or more projected amounts of sales received from the two or more sellers.

12. A computer implemented method for managing the impact of foreign exchange on the sale of a good or service in an online transaction, the method comprising the steps of:

receiving digital data into a computer storage, the digital data comprising a currency exchange price that relates a cost to exchange a foreign currency into a base currency, wherein the currency exchange price will be adhered to for amounts comprising amounts exchanged as a result of one or more transactions which involve the sale of at least one of: goods and services sold by a particular seller, and upon condition that at the time of the receipt of the digital data indicative of a currency exchange price, a market spot price for currency exchange between the base currency and the foreign currency remains within a band comprising one or more of: an upper currency exchange price tolerance parameter and a lower currency exchange price tolerance parameter;

storing digital data in the computer memory comprising a price for one or more of: goods and services, wherein the price is denominated in the base currency;

calculating a selling price with a processor operative with executable software, the selling price comprising a price for the one or more of: goods and services, denominated in the foreign currency and based upon the price for the one or more of: goods and services denominated in the base currency, and the currency exchange price;

calculating a forward contract amount comprising an exchange of the base currency and the foreign currency based upon an aggregate of two or more projected amounts of sales received from the two or more sellers; and outputting digital data comprising an offer for sale by the particular seller for the one or more of: goods and services, wherein the offer for sale comprises the selling price denominated in the foreign currency.

13. The computer implemented method of claim 12 additionally comprising the steps of:

receiving digital data into the computer storage, the digital data comprising details of an execution of one or more online transactions comprising an acceptance of the offer for sale by the particular seller; and transmitting digital data comprising an amount of foreign currency involved in the one or more online transactions comprising an acceptance of the offer for sale, to the currency exchange provider.

14. A computer implemented method for managing the impact of foreign exchange on the sale of a good or service in an online transaction the method comprising the steps of:

receiving digital data into a computer storage, the digital data comprising a currency exchange price that relates a cost to exchange a foreign currency into a base currency wherein the currency exchange price will be adhered to for amounts comprising amounts exchanged as a result of one or more transactions which involve the sale of at least one of: goods and services sold by a particular seller, and upon condition that at the time of the receipt of the digital data indicative of a currency exchange price, a market spot price for currency exchange between the base currency and the foreign currency remains within a band comprising one or more of: an upper currency exchange price tolerance parameter and a lower currency exchange price tolerance parameter;

storing digital data in the computer memory comprising a price for one or more of: goods and services, wherein the price is denominated in the base currency;

calculating a selling price with a processor operative with executable software, the selling price comprising a price for the one or more of: goods and services, denominated in the foreign currency and based upon the price for the one or more of: goods and services denominated in the base currency, and the currency exchange price; and outputting digital data comprising an offer for sale by the particular seller for the one or more of: goods and services wherein the offer for sale comprises the selling price denominated in the foreign currency;

calculating with a processor operative with executable software, a projected amount of currency involved in sales executed by the seller during a predetermined period of time; and transmitting digital data to the currency exchange provider comprising the projected amount of currency involved in sales executed by the seller during a predetermined period of time, wherein the currency exchange price received is based upon the transmitted digital data comprising the projected amount of currency involved in sales executed by the seller during the predetermined period of time.

15. The computer implemented method of claim 14 additionally comprising the steps of:

aggregating notional data comprising one or more transaction amounts with a processor operative with executable software;

calculating with the processor operative with executable software, an amount of currency to be exchanged, wherein the amount of currency to be exchanged comprises the aggregate notional amount minus an amount to be retained in a foreign currency; and transmitting digital data comprising the amount of currency to be exchanged.

16. The computer implemented method of claim 14 additionally comprising the steps of transmitting digital data comprising an indication of delivery of the one or more of: goods and services, sold by the particular seller.

* * * * *